US010947796B2

(12) United States Patent
Walker et al.

(10) Patent No.: US 10,947,796 B2
(45) Date of Patent: Mar. 16, 2021

(54) POWER SWIVEL AND GOOSENECK

(71) Applicant: National Oilwell Varco, L.P., Houston, TX (US)

(72) Inventors: Christopher Brian Walker, Cypress, TX (US); Henry Do, Katy, TX (US); Robert Ioan Papp, Houston, TX (US); Mihail Puscas, Rosenberg, TX (US); Calvin Ronald Blankenship, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 280 days.

(21) Appl. No.: 15/769,921

(22) PCT Filed: Oct. 21, 2016

(86) PCT No.: PCT/US2016/058182
§ 371 (c)(1),
(2) Date: Apr. 20, 2018

(87) PCT Pub. No.: WO2017/070513
PCT Pub. Date: Apr. 27, 2017

(65) Prior Publication Data
US 2020/0248513 A1 Aug. 6, 2020

Related U.S. Application Data

(60) Provisional application No. 62/245,501, filed on Oct. 23, 2015.

(51) Int. Cl.
*E21B 21/01* (2006.01)
*E21B 21/08* (2006.01)
(Continued)

(52) U.S. Cl.
CPC ............. *E21B 21/01* (2013.01); *E21B 21/08* (2013.01); *E21B 17/023* (2013.01); *E21B 19/16* (2013.01); *E21B 21/106* (2013.01); *F16L 9/00* (2013.01)

(58) Field of Classification Search
CPC ...................................................... E21B 19/16
(Continued)

(56) References Cited

U.S. PATENT DOCUMENTS

| 2008/0230274 A1 | 9/2008 | Stubstad |
| 2012/0325486 A1 | 12/2012 | Gilmore et al. |
| 2015/0013992 A1 | 1/2015 | Mann et al. |

OTHER PUBLICATIONS

International Patent Application No. PCT/US2016/058182 International Search Report and Written Opinion dated Jan. 17, 2017 (13 pages).

*Primary Examiner* — Taras P Bemko
(74) *Attorney, Agent, or Firm* — Conley Rose, P.C.

(57) ABSTRACT

A gooseneck (100) and a power swivel (10) including a gooseneck (100) are disclosed. In an embodiment, the gooseneck includes an inlet section (120) including an inlet (124) and a first fluid flow path (170) extending from the inlet. In addition, the gooseneck includes an outlet section (150) coupled to the inlet section. The outlet section includes an outlet (156). In addition, the outlet section (150) includes a second fluid flow path (160) extending axially from the outlet. The second fluid flow path is in fluid communication with the first fluid flow path. Further, the outlet section includes a radially outer surface (150c) that includes a first polygonal section having a plurality of planar surfaces (166) joined at a plurality of corners (168).

23 Claims, 11 Drawing Sheets

(51) Int. Cl.
    *E21B 17/02* (2006.01)
    *E21B 19/16* (2006.01)
    *E21B 21/10* (2006.01)
    *F16L 9/00* (2006.01)
(58) Field of Classification Search
    USPC .......................................................... 175/57
    See application file for complete search history.

POWER SWIVEL AND GOOSENECK

CROSS-REFERENCE TO RELATED APPLICATIONS

This application is a 35 U.S.C. § 371 national stage entry of PCT/US2016/058182, filed Oct. 21, 2016, and entitled "Power Swivel and Gooseneck" which claims benefit of U.S. provisional patent application Ser. No. 62/245,501 filed Oct. 23, 2015, and entitled "Power Swivel and Gooseneck," the contents of each are hereby incorporated herein by reference in their entirety.

STATEMENT REGARDING FEDERALLY SPONSORED RESEARCH OR DEVELOPMENT

Not applicable.

BACKGROUND

This disclosure generally relates to drilling a subterranean well for the recovery of hydrocarbons. More particularly, this disclosure relates to power swivels for drilling a subterranean wellbore.

A power swivel is used to drive rotation of a tubular string and drill bit to form or extend a subterranean wellbore. The power swivel may be driven, in at least some examples, by a hydraulic motor that transfers torque to the drill bit and attached drill string through a gear box. In addition, the power swivel may include a gooseneck that routes fluid (e.g., drilling fluids) from a source and into the tubular string and drill bit during drilling operations.

BRIEF SUMMARY OF THE DISCLOSURE

Some embodiments disclosed herein are directed to a gooseneck. In an embodiment, the gooseneck includes an inlet section including an inlet and a first fluid flow path extending from the inlet. In addition, the gooseneck includes an outlet section coupled to the inlet section. The outlet section includes a second fluid flow path extending axially from the outlet. The second fluid flow path is in fluid communication with the first fluid flow path. In addition, the outlet includes a radially outer surface that includes a first polygonal section having a plurality of planar surfaces joined at a plurality of corners.

Other embodiments disclosed herein are directed to a power swivel for rotating a tubular string to form a borehole in a subterranean formation. In an embodiment, the power swivel includes a motor. In addition, the power swivel includes a stem coupled to the motor such that the motor is configured to rotate the stem about a rotational axis. The stem is configured to be coupled to the tubular string. Further, the power swivel includes a gooseneck in fluid communication with the stem. The gooseneck includes an inlet section including an inlet and a first fluid flow path extending from the inlet. In addition, the gooseneck includes an outlet section coupled to the inlet section. The outlet section includes an outlet. In addition, the outlet section includes a second flow passage extending axially from the outlet. The second fluid flow path is in fluid communication with the first fluid flow path. Further, the outlet section includes a radially outer surface that includes a first polygonal section having a plurality of planar surfaces joined at a plurality of corners.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1:
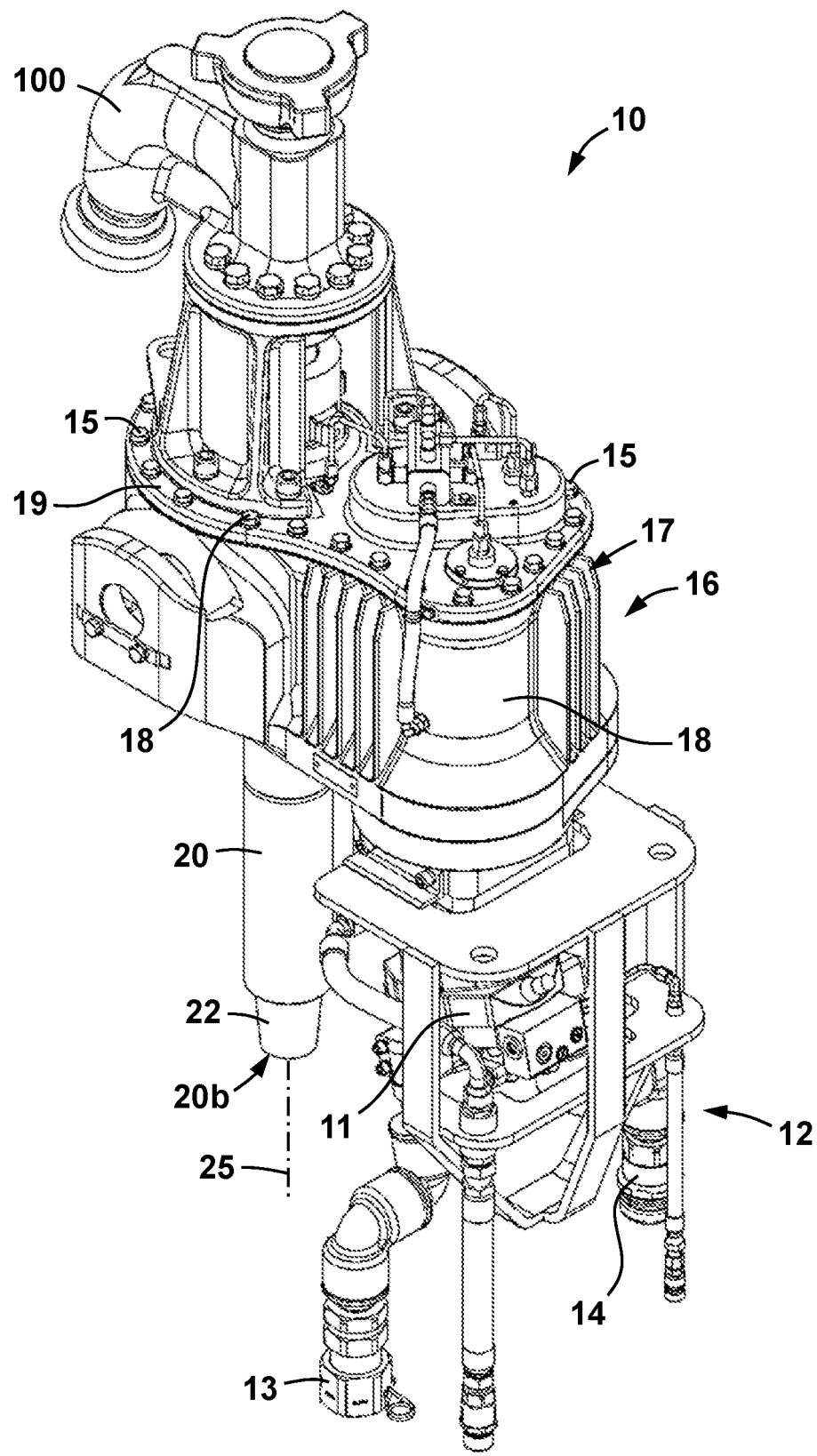
FIG. 1 is a perspective view of a power swivel including a gooseneck in accordance with at least some embodiments disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device or component or portion thereof couples to a second, that connection may be through a direct physical engagement of the two devices, components or portions, or through an indirect connection that is established via other devices, components, portions, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, a power swivel may include a gooseneck that routes fluid (e.g., drilling fluids) from a source and into a tubular string during drilling operations. In some situations, the gooseneck can limit the maximum allowable pressure of drilling fluid (or other fluids) that the power swivel may deliver to the tubular string (i.e., the maximum allowable pressure within the power swivel in general may be limited by the maximum allowable pressure within the gooseneck). As the drilling and production conditions become more challenging, there will be an increased need for higher pressure drilling fluids to effectively and safely drill a subterranean wellbore for oil and gas exploration and production. Accordingly, there is a need for a gooseneck on a power swivel that can withstand a high internal pressure to facilitate these more challenging drilling operations. Therefore, embodiments disclosed herein include goosenecks, and power swivels incorporating the same, that are shaped to withstand higher internal pressures than conventional gooseneck designs.

Figure 2:
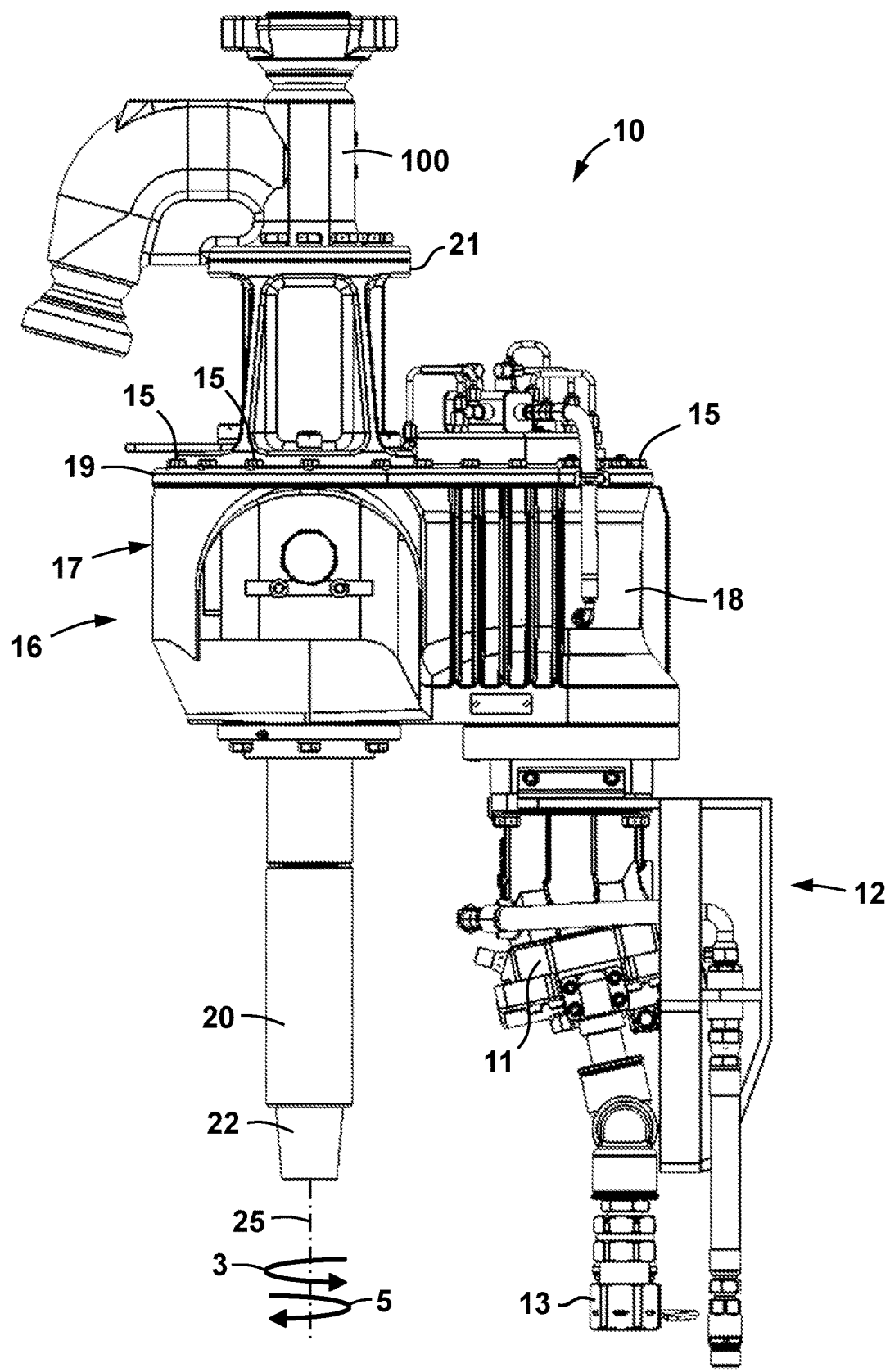
FIG. 2 is a side view of the power swivel of FIG. 1.

Referring now to FIGS. 1 and 2, a power swivel 10 for rotating a tubular string (e.g., a drill string) to form or extend a subterranean borehole is shown. In general, power swivel 10 includes a motor 12, a gear box 16, a stem 20, and a gooseneck 100. Motor 12 may be any suitable motor or other driving mechanism that is configured to output a torque to drive rotation of stem 20 (and thus the tubular string coupled thereto). For example, in some embodiments, motor 12 comprises a hydraulic motor, electric motor, an internal combustion engine, or some combination thereof. In this embodiment, motor 12 comprises a hydraulic motor and includes a motor body 11, an inlet 13, and an outlet 14 (outlet is shown in FIG. 1). During operations, inlet 13 receives a flow of pressurized fluid (e.g., hydraulic fluid) and routes the same through motor body 11 and out from outlet 14. Forcing the pressurized fluid from motor body 11 causes an output shaft (e.g., see output shaft 124 in FIG. 3) to rotate. Upon being routed through motor body 11, the now spent fluid is emitted from outlet 14 where it may then be recirculated, re-pressurized, and flowed back to inlet 13 or is simply discarded.

Gear box 16 includes an outer housing 17 that encloses one or more gears, bearings, and/or other torque transfer devices that transfer the torque generated by motor 12 to stem 20. Housing 17 includes a main casing body 18 and a top or lid 19 secured to body 18 with a plurality of coupling members 15. Coupling members 15 may be any suitable member or device for joining and securing two components to one another, and may include, for example, screws, bolts, rivets, etc. Regarding the internal configuration of the gears, bearings, etc. within housing 17 of gear box 16, one of ordinary skill will appreciate that the internal gears or other torque transfer devices within gear box 16 may be disposed in various known configurations or designs, which have no particular bearing on the scope of this disclosure. Thus, a detailed discussion of the internal configuration of the gears, shafts, bearings, etc. within gear box 16 is omitted herein in the interests of brevity.

Referring still to FIG. 2, stem 20 is used to transfer the torque generated by motor 12 to a tubular string and drill bit (not shown) during operations. As shown, stem 20 comprises a tubular member including a central or longitudinal axis 25, a first end disposed within outer housing 17 of gear box 16 (and therefore not shown), and a second or lower end 20b extending outward from outer housing 17. Lower end 20b includes a threaded connector 22, which in this embodiment comprises a threaded pin connector having a plurality of external threads for coupling with a threaded box connector on an upper end of the tubular string (not shown). As previously mentioned above, stem 20 is operationally coupled to motor 12 via the gears and/or other torque transfer devices within gear box 16 such that rotation of the output shaft of motor 12 (not specifically shown in FIGS. 1 and 2) causes a corresponding rotation of stem 20 about axis 25. When stem 20 is coupled to a tubular string (e.g., at threaded connector 22) that extends into a subterranean borehole, the rotation of stem 20 about axis 25 also causes rotation of the tubular string and any tools that are disposed on the axially lower end thereof (e.g., a drill bit).

As is best shown in FIG. 2, in this embodiment the flow of pressurized fluid from inlet 13 through motor body 11 and out of outlet 14 causes rotation of stem 20 in a first direction 3 about axis 25, while the flow of pressurized fluid from outlet 14 through body 11 and out of inlet 13 causes stem 20 rotate in a second direction 5 about axis 25 that is opposite the first direction 3. Thus, references to inlet 13 as an "inlet" and outlet 14 as an "outlet" are merely made as a matter of convenience, and power swivel 10 may be operated to rotate stem 20 in either the first direction 3 or the second direction 5 during operations.

Generally speaking, during drilling operations with power swivel 10, a tubular string (not shown) is coupled to stem 20 at connector 22, and a drill bit is further secured to the axially opposite end of the tubular string. Thereafter, stem 20 is rotated about axis 25 (e.g., in direction 3 or 5) in the manner described above (i.e., by motor 12) to cause a corresponding rotation of the tubular string and drill bit. When drill bit is placed in contact with a subterranean formation, rotation of the drill bit (via power swivel 10) causes the bit to form or extend a borehole therein. During these drilling operations, drilling fluids (e.g., drilling mud) are supplied to stem 20 through gooseneck 100 that is further coupled to a fluid source (e.g., a tank, pit, etc.). The drilling fluids are then emitted from lower end 20b of stem 20 and routed through the tubular string and drill bit in order to, among other things, cool the drill bit, lubricate the engagement between the bit and the formation, and carry cuttings of the formation back to the surface. The structural details of gooseneck 100 will now be described in more detail below.

Figure 3:
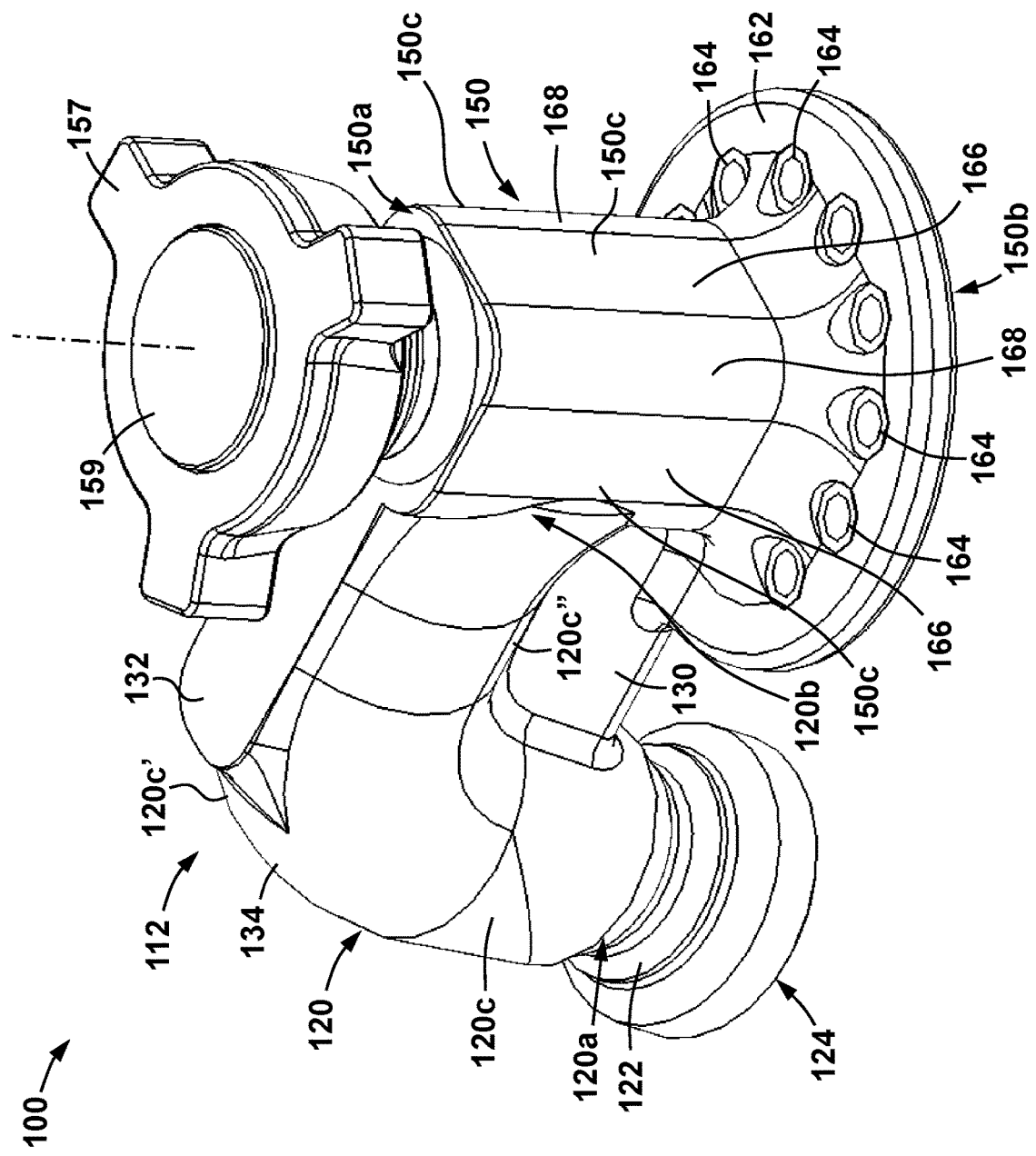
FIG. 3 is a perspective view of the gooseneck of FIG. 1.
Figure 4:
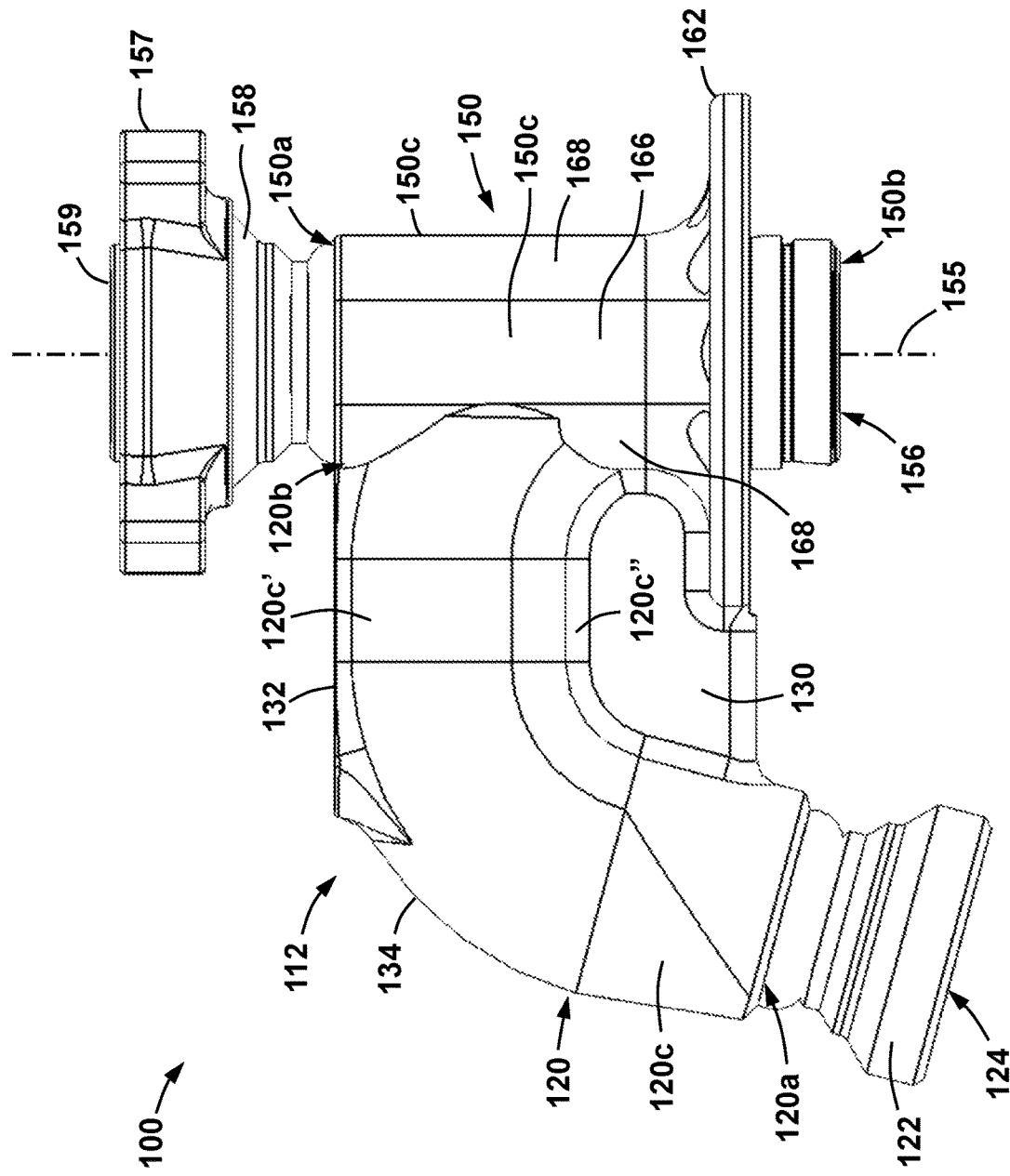
FIG. 4 is a side view of the gooseneck of FIG. 1.

Referring now to FIGS. 3 and 4, gooseneck 100 generally includes a body 112 having an inlet section 120, and an outlet section 150. Outlet section 150 includes a central or longitudinal axis 155 that is aligned with axis 25 of stem 20 when gooseneck 100 and stem 20 are both installed in power swivel 10 (see FIGS. 1 and 2). In addition, outlet section 150 includes a first or upper end 150a, a second or lower end 150b opposite upper end 150a, and a radially outer surface 150c also extending axially between ends 150a, 150b. An outlet 156 extends axially into outlet section 150 from lower end 150b, while an intervention port 153 (see FIG. 6) extends axially into outlet section 150 from upper end 150a. A fluid flow path 160 extends axially through outlet section 150 between port 153 and outlet 156. As will be described more detail below, drilling fluids are routed along fluid flow path 160 and are emitted from outlet 156 and into stem 20 during drilling operations with power swivel 10 (see FIG. 6).

A flange 162 extends radially outward from radially outer surface 150c at a position that is more proximate lower end 150b than upper end 150a. Referring briefly again to FIGS. 1 and 2, flange 162 engages with a bonnet 21 that is further mounted to lid 19 of housing 17 to thereby secure gooseneck 100 to power swivel 10. Referring back now to FIGS. 3 and 4, flange 162 includes a plurality of apertures 164 that are circumferentially spaced about axis 155. Each aperture 164 extends axially through flange 162 to receive a coupling member (e.g., screw, bolt, rivet, etc.) therethrough to secure flange 162 and thus gooseneck 100 to bonnet 21 (see FIGS. 1 and 2).

Figure 6:
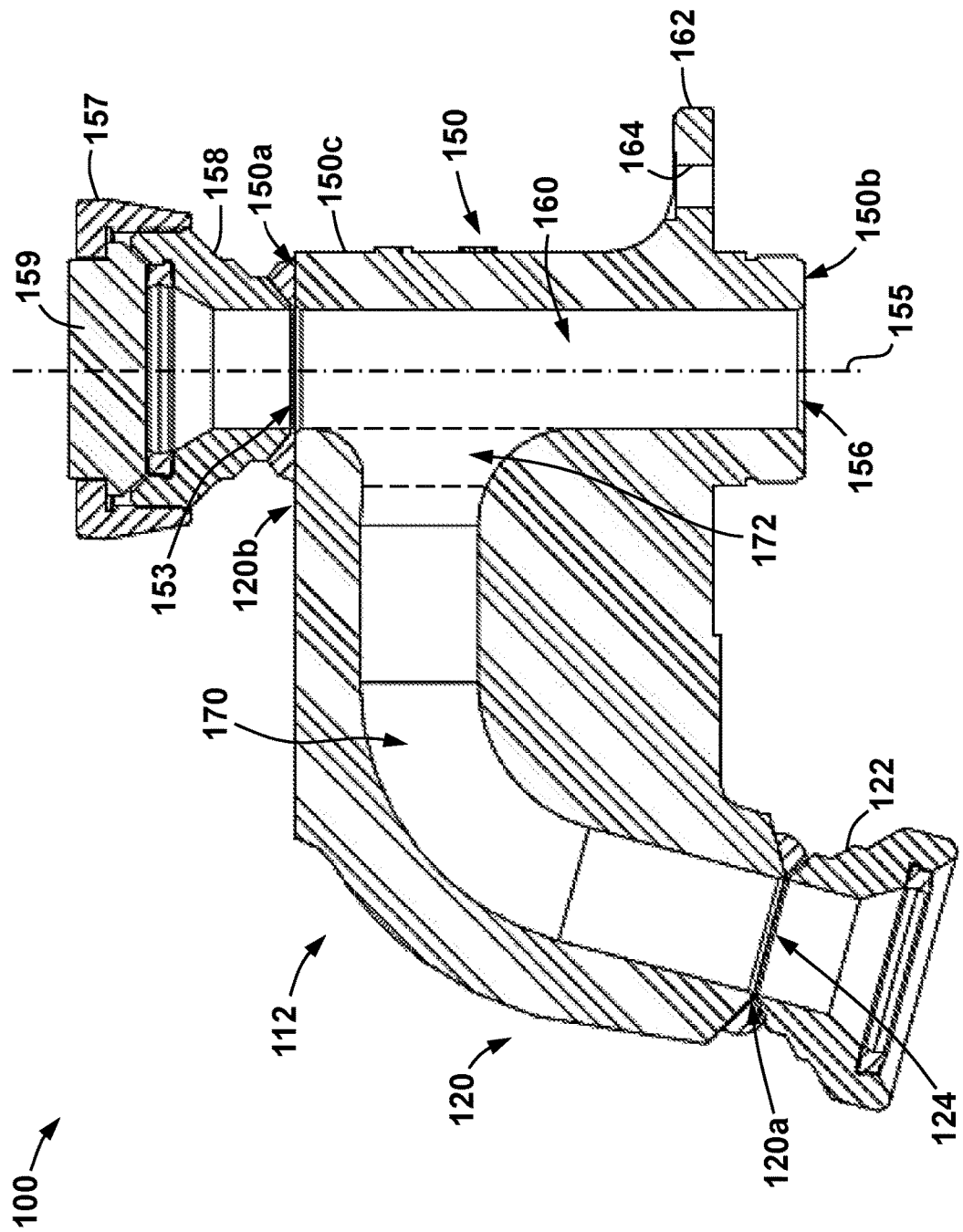
FIG. 6 is a cross-sectional view taken along section VI-VI in FIG. 5.

Referring briefly to FIG. 6, a connector 158 is coupled to upper end 150a of outlet section 150 at intervention port 153 that receives a plug 159 therein to prevent or at least restrict the flow of fluids into fluid flow path 160 through port 153 during operations. In this embodiment, plug 159 is secured in connector 158 with a hammer union 157; however, any other suitable device or method may be used to secure plug 159 within connector 158. In addition, in this embodiment, connector 158 is welded to upper end 150a; however, other connection methods or devices may be used in other embodiments.

Figure 5:
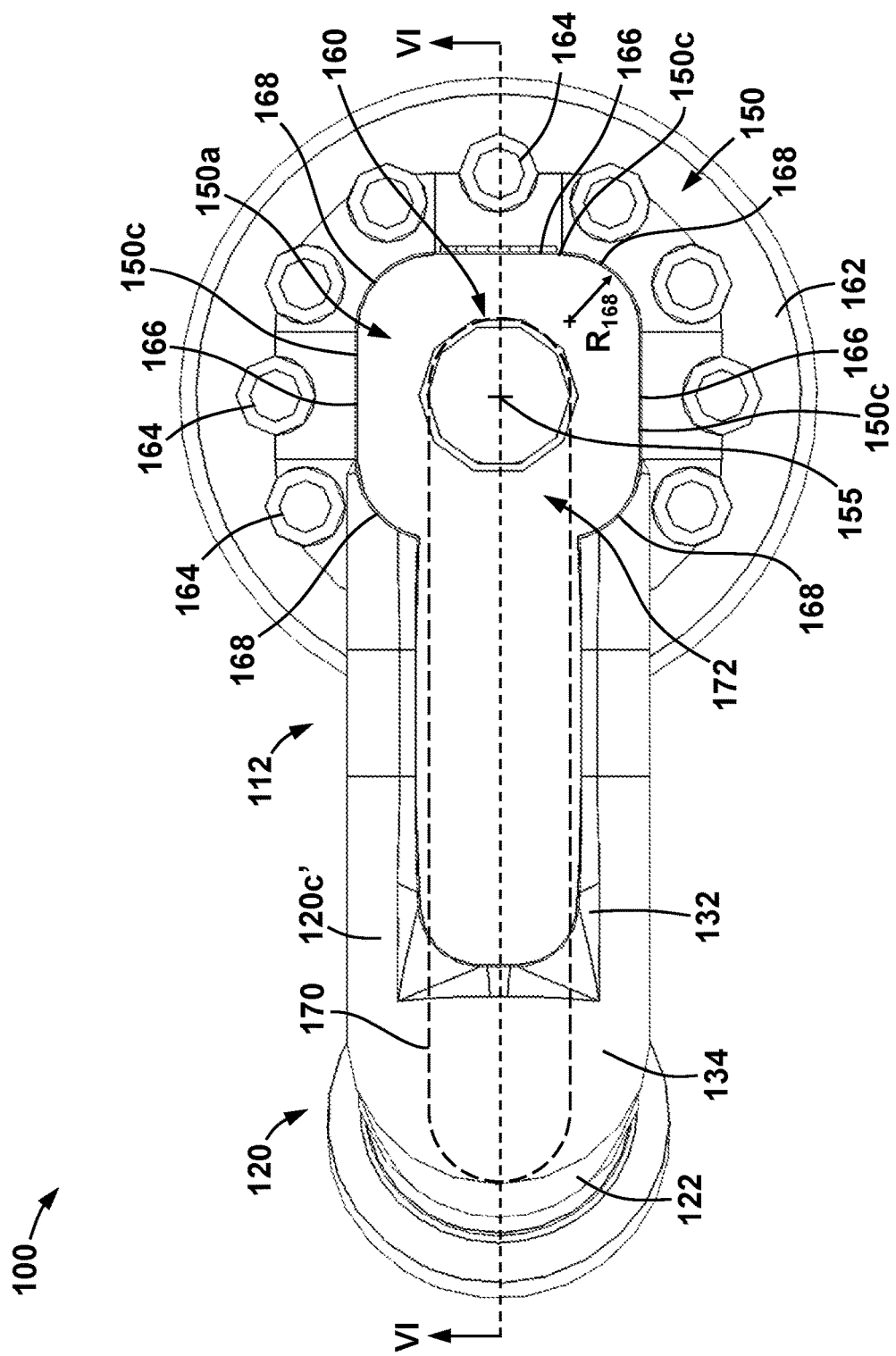
FIG. 5 is a top view of the gooseneck of FIG. 1.

Referring now to FIGS. 3-5, radially outer surface 150c is polygonal in shape when viewed along a cross-section that is perpendicular to axis 155. In particular, radially outer surface 150c includes a plurality of planar surfaces 166 connected at a plurality of corners 168. In this embodiment, radially outer surface 150c is rectangular polygonal in shape when viewed along a cross-section that is perpendicular to axis 155 and therefore includes a total of four (4) corners 168 disposed between adjacent planar surfaces 166. In addition, each planar surface 166 extends perpendicularly to each immediately circumferentially adjacent planar surface 166. However, it should be appreciated that radially outer surface 150c may be formed into any number of polygonal shapes (e.g., pentagonal, hexagonal, octagonal, etc.) when viewed in cross section and therefore may include more or less than four (4) corners in other embodiments. Each of the corners 168 of radially outer surface 150c is rounded or radiused to increase the wall thickness of outlet section of gooseneck 100. Specifically, as is best shown in FIG. 5, in this embodiment each corner 168 has a radius of curvature $R_{168}$ that is larger than ⅜ inches and is more preferably between ⅜ inches and 1¼ inches, inclusive.

Referring again to FIGS. 3 and 4, inlet section 120 is a curved tubular member that includes a first end 120a, a second end 120b, and a radially outer surface 120c extending between ends 120a, 120b. As best shown in FIG. 4, radially outer surface 120c includes a first or upper side 120c' and a second or lower side 120c". In this embodiment, both upper side 120c' and lower side 120c" are curved such that the inlet section 120 is substantially circular in cross section. Second end 120b abuts or engages outlet section 150 such that upper side 120c' and lower side 120c" of radially outer surface 120c each abut radially outer surface 150c of outlet section 150.

A stiffener rib 130 extends radially with respect to axis 155 from flange 162 and radially outer surface 150c to inlet section 120 and along lower side 120c" of radially outer surface 120c. Rib 130 provides additional stiffness and strength to gooseneck 100. In addition, in at least some embodiments, rib 130 simplifies the manufacturing process for gooseneck 100. Specifically, body 112 of gooseneck 100 may be manufactured as a single monolithic piece through a casting process. Production of intricate recesses can be difficult during a casting process, therefore rib 130 simplifies the mold required to form body 112, and therefore reduces the difficulty and costs for manufacturing gooseneck 100.

Referring still to FIGS. 3 and 4, a projection 132 extends outward from upper side 120c' of radially outer surface 120c of inlet section 120. In addition, in this embodiment, upper side 120c' includes an elliptical curvature 134 in side view (e.g., as shown in FIG. 4) that extends from projection 132 toward first end 120a. Without being limited to this or any other theory, projection 132 and elliptical curvature 134 each increase the wall thickness of inlet section 120, thereby increasing the stresses and internal pressures that inlet section 120 may withstand during operation. In addition, in at least some embodiments, projection 132 and curvature 134 also enhance the manufacturing process for gooseneck 100. Specifically, when gooseneck 100 is manufactured through a casting process as previously described, it is typically desirable to cool the entire casted gooseneck substantially evenly following pouring of molten materials (e.g., metals) into the mold, to avoid the creation of internal stresses in the gooseneck. For gooseneck 100, the additional material added by rib 130 necessitates the inclusion of additional material to an opposing side (i.e., upper side 120c") such that the upper and lower sides 120c', 120c", respectively cool together at substantially the same rate. Thus, the additional wall thickness provided by projection 132 and elliptical curvature 134 add sufficient materials to upper section 120c' to offset the additional material added by rib 130 at lower section 120c", and thereby reduces the chances that damaging internal stresses (which may lead to cracking) will be created during the manufacturing process for gooseneck 100.

Referring now to FIG. 6, an inlet 124 extends into inlet section 120 from first end 120a, and a connector 122 is mounted to first end 120a at inlet 124 to facilitate connection of a conduit (e.g., pipe, tube, hose, etc.) to inlet 124 during operations. As with connector 158, connector 122 may be secured to first end 120a in any suitable fashion, such as, for example, welding. In addition, a fluid flow path 170 extends through inlet section 120 from inlet 124 to second end 120b. Fluid flow path 170 is in communication with fluid flow path 160 through a transition section 172 that extends through the wall of outlet section 150. Conventionally, the connection or transition point between two fluid flow paths in a gooseneck or other similar component serves as an area of relatively thin wall thickness, such that these transition points can limit the maximum allowable pressures that both fluid flow paths may receive and contain. However, for gooseneck 100 disclosed herein, because the radially outer surface 150c of outlet section 150 is polygonal in shape as previously described, the wall thickness at transition section 172 may be increased, thereby increasing the maximum allowable pressure that gooseneck 100 may withstand when compared to conventional designs.

Specifically, referring to FIG. 5, transition section 172 extends between fluid flow paths 160, 170 at one of the planar surfaces 166 and therefore between a pair of corners 168 forming radially outer surface 150c. Corners 168 provide an increase in the amount of wall thickness at transition section 172, and therefore increase the pressure that transition section 172 (and thus gooseneck 100) may withstand during operations. As previously described, in the current embodiment disclosed in FIG. 5, radially outer surface 150c is rectangular polygonal; however, in other embodiments, surface 150c may comprise any number of polygonal shapes while still offering the benefits discussed above. In particular, regardless of the polygonal shape employed for radially outer surface 150c, extending transition section 172 through outlet section 150 along one of the planar surfaces 166 and between a pair of the corners 168 provides the opportunity for an overall increase in the wall thickness at transition section 172 and therefore an increase in the maximum allowable pressures within gooseneck 100.

Referring now to FIGS. 1, 2, and 6, during operations with gooseneck 100, as power swivel 10 operates to rotate stem 20 about axis 25 (see FIGS. 1 and 2), drilling fluids are routed through gooseneck 100 to stem 20. In particular, drill fluids are routed from a source through a conduit (e.g., hose, pipe, etc.) that is coupled to inlet port 124 via connector 122. Thereafter, the drill fluids flow along fluid flow path 170 until they are routed into fluid flow path 160 via transition section 172. Finally, the drill fluid flows axially downward through fluid flow path 160 until they are emitted from outlet 156 and into a washpipe (not shown) within bonnet 21 and into stem 20. During these operations, due to the enhanced wall thickness of transition section 172, the pressure of the drill fluid flowing through gooseneck 100 may be increased above levels that are typically feasible for conventional designs, thereby increasing the functionality and performance capabilities of power swivel 10.

Figure 7:
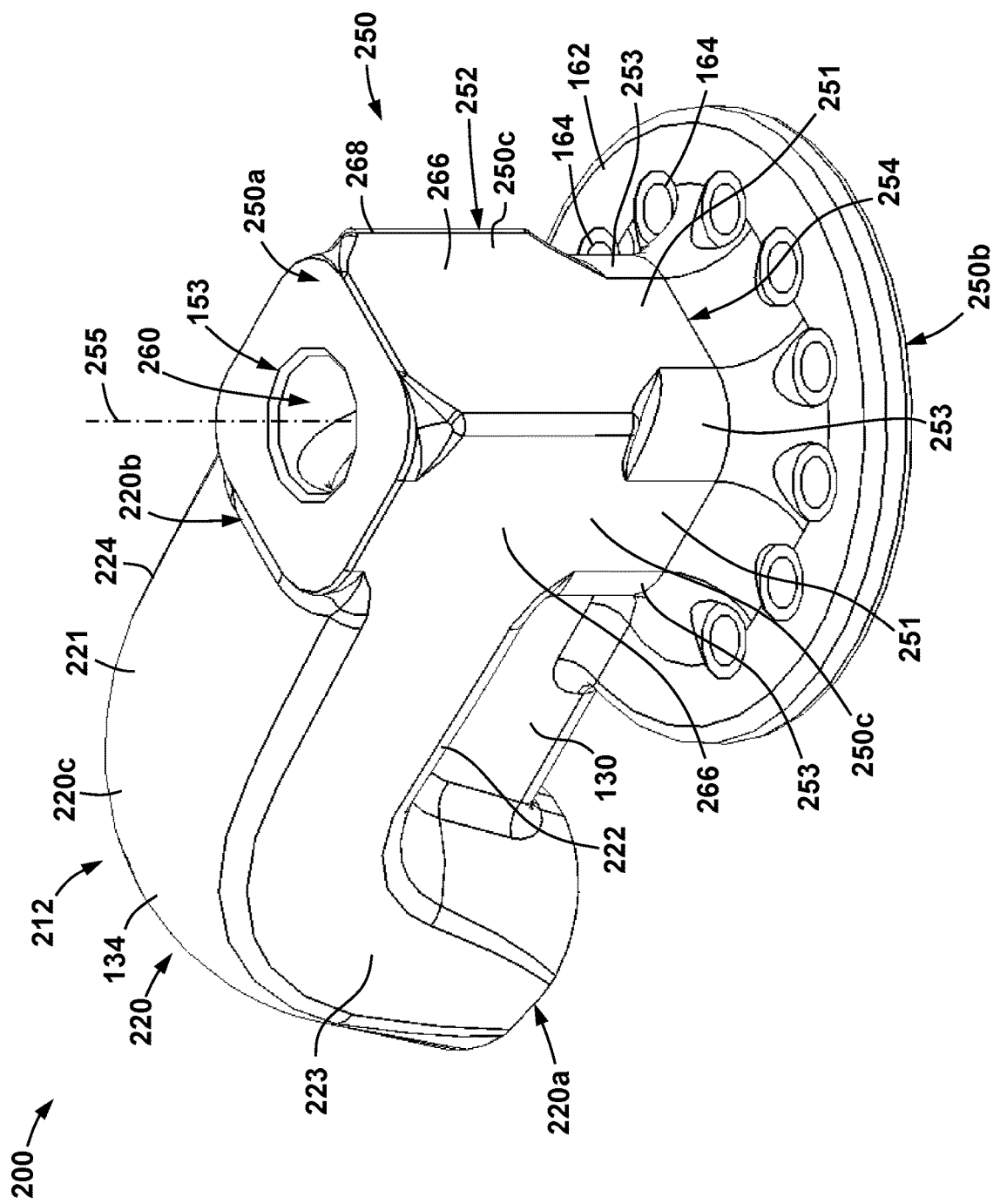
FIG. 7 is a perspective view of another gooseneck for use with the power swivel of FIG. 1 in accordance with at least some embodiments disclosed herein.
Figure 8:
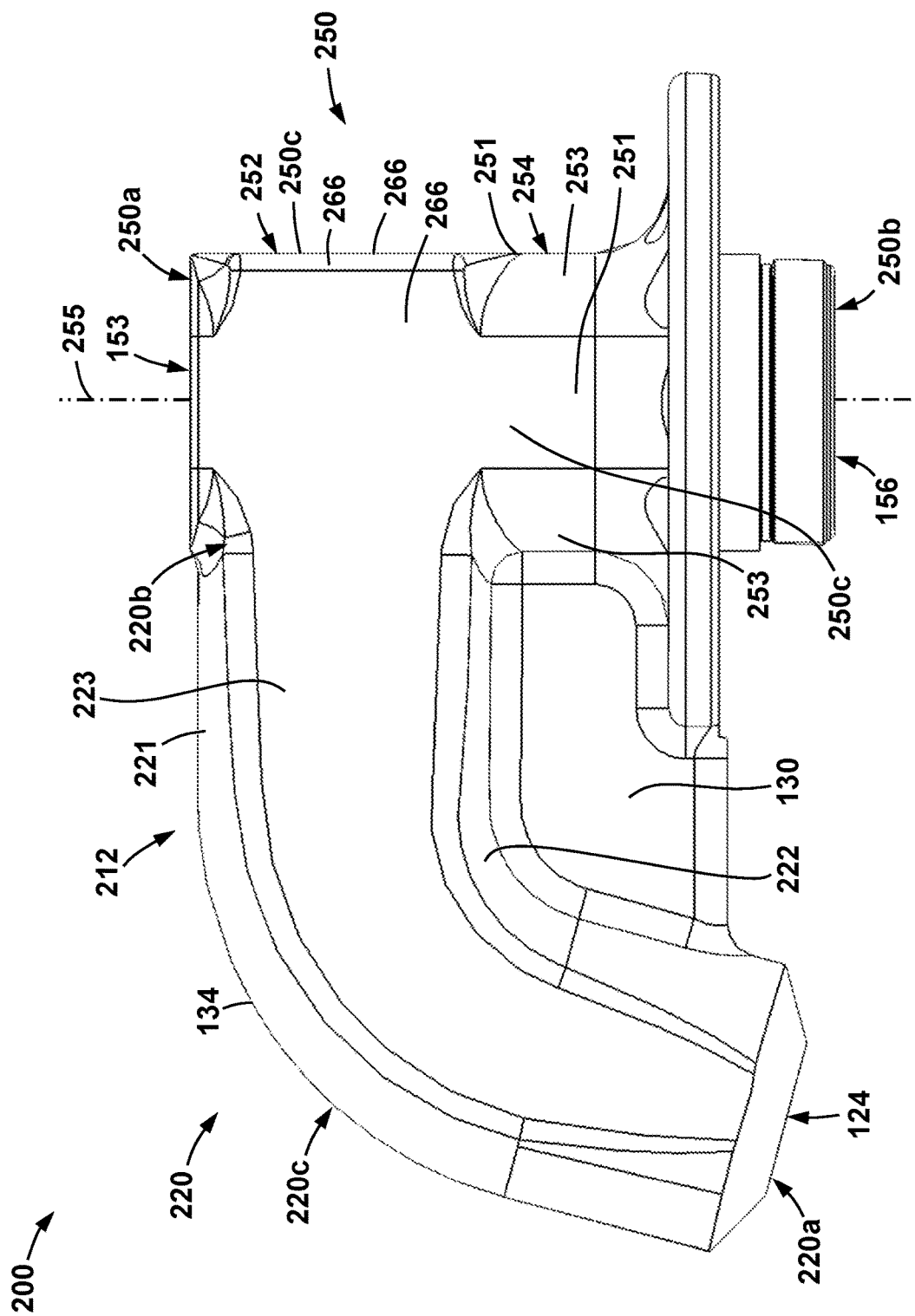
FIG. 8 is a side view of the gooseneck of FIG. 7.
Figure 12:
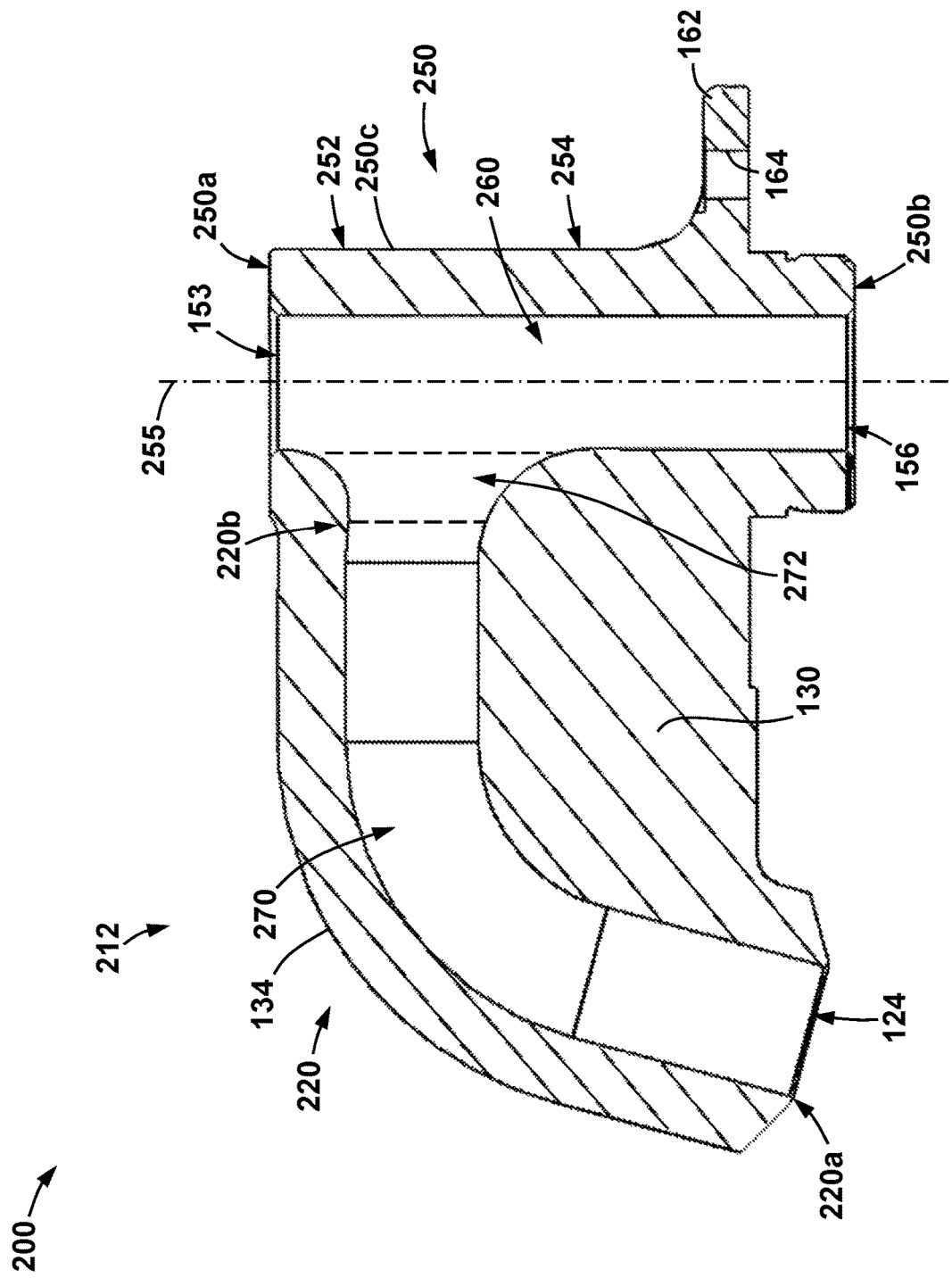
FIG. 12 is a cross-sectional view taken along section XII-XII in FIG. 9.

Referring now to FIGS. 7 and 8, another embodiment of a gooseneck 200 for use with power swivel 10 is shown. Gooseneck 200 is similar to gooseneck 100, and thus, like features are referred to with like reference numerals and the discussion below will concentrate on the features of gooseneck 200 that are different from gooseneck 100. As shown, gooseneck 200 includes a body 212 having an inlet section 220, and an outlet section 250. Outlet section 250 includes a central or longitudinal axis 255 that is aligned with axis 25 of stem 20 when gooseneck 200 and stem 20 are both installed in power swivel 10 (see FIGS. 1 and 2). In addition, outlet section 250 includes a first or upper end 250a, a second or lower end 250b opposite upper end 250a, and a radially outer surface 250c also extending between ends 250a, 250b. Lower end 250b includes outlet 156, and upper end 250a includes intervention port 153 (note: connector 158 is not shown in FIGS. 7-10 so as not to unduly complicate the figures), where outlet 156 and port 153 are the same as previously described above. In addition, as shown in FIG. 12, a fluid flow path 260 extends axially through outlet section 250 between intervention port 153 and outlet 156.

Referring still to FIGS. 7 and 8, radially outer surface 250c includes a first or upper polygonal section 252 proximate upper end 250a, flange 162 proximate lower end 250b, and a second or lower polygonal section 254 extending axially between upper polygonal section 252 and flange 162. Flange 162 includes the plurality of apertures 164 that receive coupling members for mounting gooseneck 200 to power swivel 10 as previously described.

Sections 252, 254 are both polygonal in shape when viewed along a cross-section that is perpendicular to axis 255. Lower polygonal section 254 includes a plurality of planar surfaces 251 connected at a plurality of corners 253. In addition, upper polygonal section 254 includes a plurality of planar surfaces 266 connected at a plurality of corners 268. In this embodiment, upper polygonal section 252 and lower polygonal section 254 are each rectangular polygonal in shape when viewed along a cross-section that is perpendicular to axis 255. Thus, each planar surface 266 of upper polygonal section 252 extends perpendicularly to each immediately circumferentially adjacent surface 266, and each planar surface 251 of lower polygonal section 254 extends perpendicularly to each immediately circumferentially adjacent surface 251. As is shown in FIGS. 7 and 8, the planar surfaces 266 of upper polygonal section 252 are each flush with a corresponding one of the planar surfaces 251 of lower polygonal section 254. In other words, each of the planar surfaces 266 of upper polygonal section 252 lies in the same plane (that extends parallel to axis 255) as a corresponding one of the planar surfaces 251 of the lower polygonal section 254.

Figure 11:
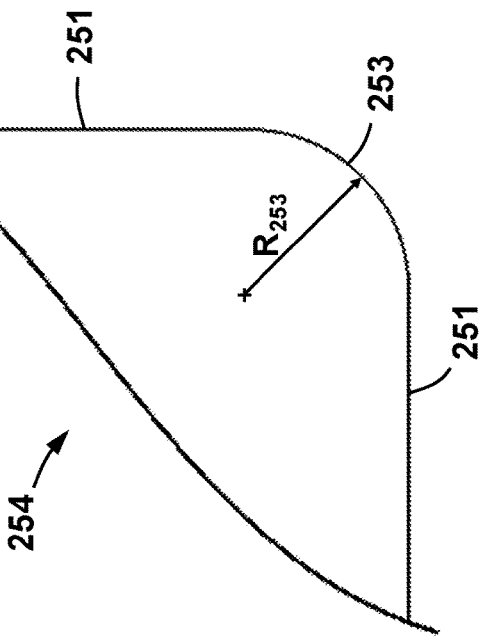
FIG. 11 is a schematic, enlarged cross-section of a portion of the lower polygonal section of outlet section of the gooseneck of FIG. 7.
Figure 10:
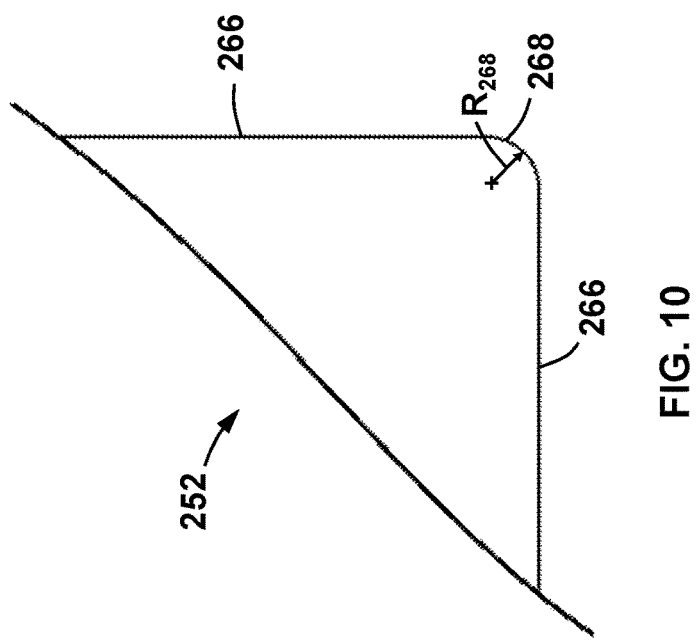
FIG. 10 is a schematic, enlarged cross-section of a portion of the upper polygonal section of the outlet section of the gooseneck of FIG. 7.

Referring briefly now to FIGS. 10 and 11, each of the corners 253, 268 of upper polygonal section 252 and lower polygonal section 254, respectively, is rounded or radiused to, for example, increase the wall thickness of outlet section of gooseneck 200. Specifically, in this embodiment, each corner 253 on lower polygonal section 254 has a radius of curvature $R_{253}$, and each corner 268 of upper polygonal section 252 has a radius of curvature $R_{268}$. In this embodiment, the radius of curvature $R_{268}$ of corners 268 is smaller than the radius of curvature $R_{253}$ of corners 253. Thus, the corners 268 are sharper or less gradual than the corners 253. More particularly, in this embodiment, radius of curvature $R_{253}$ is preferably ⅜ inches or larger and is more preferably between ⅜ inches and 1¼ inches, inclusive, and radius of curvature $R_{268}$ is preferably between ¼ and ⅜ inches, inclusive.

Referring again to FIGS. 7 and 8, inlet section 220 is a curved tubular member that includes a first end 220a, a second end 220b, and a radially outer surface 220c extending between ends 220a, 220b. An inlet 124, being the same as previously described above, extends into first end 220a. A connector (e.g., connector 122 shown in FIG. 6) may be secured to first end 220a in the manner described above for gooseneck 100; however, the connector is not shown in FIGS. 7-12 so as not to unduly complicate the figures. As best shown in FIG. 7, radially outer surface 220c includes a first or upper surface 221, a second or lower surface 222, a third side surface 223, and a fourth side surface 224. Second end 220b abuts or engages outlet section 250 such that each of the upper surface 221, lower surface 222, and side surfaces 223, 224 abut radially outer surface 250c of outlet section 250. In particular, each of the surfaces 221, 222, 223, 224 abut upper polygonal section 252 of outlet section 250.

Figure 9:
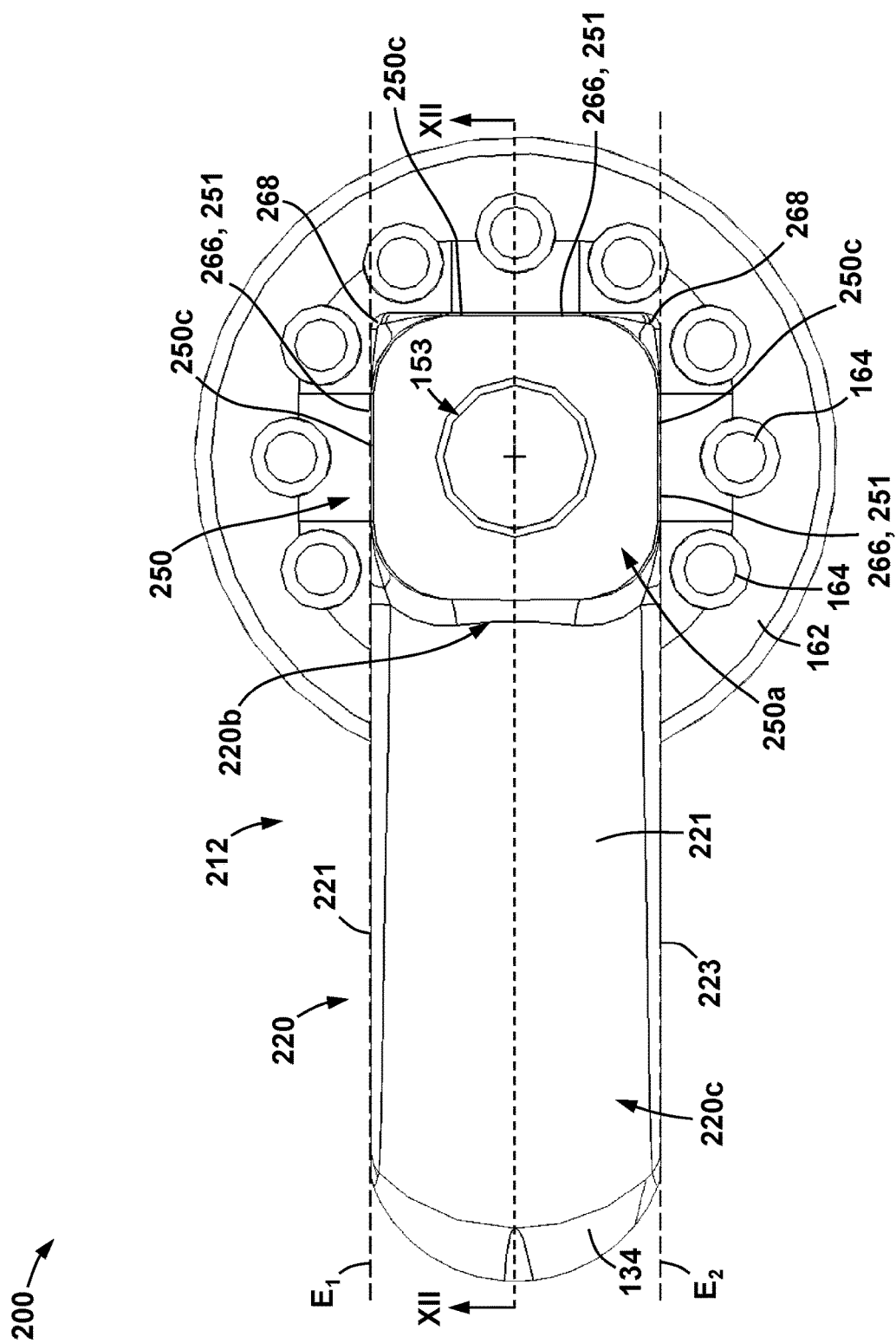
FIG. 9 is a top view of the gooseneck of FIG. 7.

Referring now to FIGS. 7-9, each of the side surface 223, 224 are planar, while each of the upper surface 221 and lower surface 222 are curved. Side surfaces 221, 223 are each flush with each of a corresponding one of the planar surfaces 266 of upper polygonal section 252 and a corresponding one of the planar surfaces 251 of lower polygonal section 254. In other words, as is shown in FIG. 9, each side planar surface 223, 224 lies with the same plane as each of a corresponding one of the planar surfaces 266 and a corresponding one of the planar surfaces 251, with one side planar surface 223, one of the planar surfaces 266, and one of the planar surfaces 251 being in a first plane $E_1$, and the other side planar surface 221, another one of the planar surfaces 266, and another of the planar surfaces 251 being in a second plane $E_2$ that is radially opposite the first plane $E_1$ with respect to axis 255.

In addition, upper surface 221 includes the elliptical curvature 134 in side view as discussed above for gooseneck 100. However, as with gooseneck 100, it should be appreciated that elliptical curvature 134 may not be included on gooseneck 200 in other embodiments. Further, gooseneck 200 also includes stiffener rib 130 extends radially with respect to axis 255 from flange 162 and radially outer surface 250c to inlet section 120 and along lower surface 222 of radially outer surface 220c. Because elliptical curvature 134 and stiffener rib 130 are substantially the same as described above for gooseneck 100, a detailed description of these components with respect to gooseneck 200 is not provided again in the interests of brevity.

Referring now to FIG. 12, inlet section 120 also includes a fluid flow path 270 extending from inlet 124 to second end 220b. Fluid flow path 270 is in communication with fluid flow path 260 through a transition section 272 that extends through the wall of outlet section 250 at upper polygonal section 252. Referring to FIGS. 8 and 12, transition section 272 extends between fluid flow paths 260, 270 between the radially opposed surfaces 223, 224 and planar sides 266 of inlet section 220 and outlet section 250, respectively. Because surfaces 223, 224 are flush with one of the planar sides 266 of upper polygonal section 252 as previously described, the wall thickness at transition section 272 is increased such that transition section 272 (and thus gooseneck 200) may withstand greater internal pressures (e.g., of drilling fluids) during operations.

Referring now to FIGS. 1, 2, and 10, during operations with gooseneck 200, as power swivel 10 operates to rotate stem 20 about axis 25 (see FIGS. 1 and 2), drilling fluids are routed through gooseneck 200 to stem 20 as previously described. In particular, drill fluids are routed from a source through a conduit (e.g., hose, pipe, etc.) that is coupled to an inlet 124 (e.g., via a connector 122, not shown) coupled to first end 220a of inlet section 220. Thereafter, the drill fluids flow along fluid flow path 270 until they are routed into fluid flow path 260 via transition section 272. Finally, the drill fluid flows axially downward through fluid flow path 260 until they are emitted from outlet 156 and into a washpipe (not shown) within bonnet 21 and into stem 20. During these operations, due to the enhanced wall thickness of transition section 272, the pressure of the drill fluid flowing through gooseneck 200 may be increased above levels that are typically feasible for conventional designs, thereby increasing the functionality and performance capabilities of power swivel 10.

In the manner described, a gooseneck made in accordance with embodiments disclosed herein (e.g., goosenecks 100, 200) includes an external profile or shape that allows for enhanced wall thickness at what are weak points associated with conventional gooseneck designs such that the gooseneck 100, 200 may withstand a higher internal pressure during drilling operations. Through use of a power swivel (e.g., power swivel 10) incorporating a gooseneck made in accordance with the embodiments disclosed herein, a drilling operator may maintain a higher pressure of drilling fluid within the wellbore than otherwise would be possible with conventional systems.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention claimed below. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A gooseneck, comprising:
   an inlet section including an inlet and a first fluid flow path extending from the inlet;
   an outlet section coupled to the inlet section, the outlet section including:
   a first end, a second end opposite the first end, and an outlet;
   a second fluid flow path extending axially from the outlet, wherein the second fluid flow path is in fluid communication with the first fluid flow path;
   a radially outer surface extending from the first end to the second end and including a first polygonal section having a plurality of planar surfaces joined at a plurality of corners, the radially outer surface of the outlet section further including a flange that extends radially outward from the first polygonal section and that is disposed at a location between the first end and the second end such that a portion of the outlet section extends between the flange and the outlet, the flange including a plurality of apertures spaced about the second fluid flow path.

2. The gooseneck of claim 1, wherein the inlet section further comprises a radially outer surface having an upper side and a lower side that is opposite the upper side, wherein the upper side and the lower side each engages the outlet section along one of the planar surfaces, between a pair of the plurality of corners.

3. The gooseneck of claim 2, wherein the upper side of the radially outer surface of the inlet section includes a projection that extends outwardly away from the first fluid flow path and increases a wall thickness of the inlet section, wherein the projection includes a planar surface that engages the outlet section along one of the planar surfaces and between a pair of the plurality of corners.

4. The gooseneck of claim 1, wherein the first fluid flow path is in communication with the second fluid flow path through a transition section that extends through a wall of the outlet section, wherein the transition section couples to the outlet section between a pair of the plurality of corners.

5. The gooseneck of claim 4 wherein the gooseneck is a casted gooseneck, the inlet section, the transition section, and the outlet forming a single monolithic piece.

6. The gooseneck of claim 1, further comprising a stiffener rib extending between the inlet section and one of the planar surfaces of the first polygonal section of the outlet section.

7. The gooseneck of claim 6, wherein the stiffener rib is coupled to the flange.

8. The gooseneck of claim 6, wherein the inlet section comprises a first segment having a first wall thickness and a second segment having a second wall thickness that is greater than the first wall thickness, and wherein the second segment of the inlet section comprises a radially outer surface having an upper side and a lower side that is opposite the upper side, and wherein the stiffener rib is coupled to the lower side, and wherein a projecting portion extends from the upper side contributing to the second wall thickness.

9. The gooseneck of claim 1, wherein the outlet section further comprises a central axis and a second polygonal section axially adjacent the first polygonal section with respect to the central axis, wherein the second polygonal section includes a plurality of planar surfaces joined at a plurality of corners;
   wherein the plurality of corners of the first polygonal section each have radius of curvature that is smaller than a radius of curvature of each of the plurality of corners of the second polygonal section.

10. The gooseneck of claim 1, wherein the inlet section includes a first planar surface that is flush with one of the planar surfaces of the first polygonal section such that the first planar surface and the one of the planar surfaces of the first polygonal section lie within a first plane $E_1$.

11. The gooseneck of claim 10, wherein the first planar surface of the inlet section extends from the inlet to the radially outer surface of the outlet section.

12. The gooseneck of claim 11, wherein the inlet section includes a second planar surface that is flush with another of the planar surfaces of the first polygonal section such that the second planar surface and the another of the planar surfaces of the first polygonal section lie with a second plane $E_2$; and
wherein the outlet section further comprises a central axis; and
wherein the first plane $E_1$ and the second plane $E_2$ are radially opposite to one another across the central axis of the outlet section.

13. A power swivel for rotating a tubular string to form a borehole in a subterranean formation, the power swivel comprising:
a motor;
a stem coupled to the motor such that the motor is configured to rotate the stem about a rotational axis, wherein the stem is configured to be coupled to the tubular string;
a gooseneck in fluid communication with the stem, wherein the gooseneck comprises:
an inlet section including an inlet and a first fluid flow path extending from the inlet;
an outlet section coupled to the inlet section, the outlet section including:
an outlet, a first end, a second end opposite the first end, and an integral flange disposed at a location between the first end and the second end such that a portion of the outlet section extends between the flange and the outlet;
a second flow passage extending axially from the outlet, wherein the second fluid flow path is in fluid communication with the first fluid flow path;
a radially outer surface extending from the first end to the second end and including a first polygonal section having a plurality of planar surfaces joined at a plurality of corners, the radially outer surface of the outlet section further including the flange, the flange extending radially outward from the first polygonal section and including a plurality of apertures passing through the flange.

14. The power swivel of claim 13, wherein the inlet section further comprises a radially outer surface having an upper side and a lower side that is opposite the upper side, wherein the upper side and the lower side each engages the outlet section along one of the planar surfaces, between a pair of the plurality of corners.

15. The power swivel of claim 14, wherein the upper side of the radially outer surface of the inlet section includes a projection that extends outwardly away from the first fluid flow path and increases a wall thickness of the inlet section, wherein the projection includes a planar surface that engages the outlet section along one of the planar surfaces and between a pair of the plurality of corners.

16. The power swivel of claim 13, wherein the first fluid flow path is in communication with the second fluid flow path through a transition section that extends through a wall of the outlet section, and wherein the Gooseneck further comprises a stiffener rib coupled to the inlet section and coupled to one of the planar surfaces of the first polygonal section of the outlet section.

17. The power swivel of claim 16, wherein the transition section extends between a pair of the plurality of corners, and wherein the stiffener rib is coil led to the flange and to the transition section.

18. The power swivel of claim 17, wherein the inlet section comprises a first segment having a first wall thickness and a second segment having a second wall thickness that is greater than the first wall thickness, and wherein the stiffener rib is coupled to the second segment.

19. The power swivel of claim 18, wherein the second segment of the inlet section comprises a radially outer surface having an upper side and a lower side which is opposite the upper side, and wherein the stiffener rib is coupled to the lower side and wherein a projecting portion extends from the upper side contributing to the second wall thickness.

20. The power swivel of claim 13, wherein the outlet section further comprises a central axis and a second polygonal section axially adjacent the first polygonal section with respect to the central axis, wherein the second polygonal section includes a plurality of planar surfaces joined at a plurality of corners;
wherein the plurality of corners of the first polygonal section each have radius of curvature that is smaller than a radius of curvature of each of the plurality of corners of the second polygonal section.

21. The power swivel of claim 13, wherein the inlet section includes a first planar surface that is flush with one of the planar surfaces of the first polygonal section such that the first planar surface and the one of the planar surfaces of the first polygonal section lie within a first plane $E_1$.

22. The power swivel of claim 21, wherein the first planar surface of the inlet section extends from the inlet to the radially outer surface of the outlet section.

23. The power swivel of claim 22, wherein the inlet section includes a second planar surface that is flush with another of the planar surfaces of the first polygonal section such that the second planar surface and the another of the planar surfaces of the first polygonal section lie with a second plane $E_2$; and
wherein the outlet section further comprises a central axis; and
wherein the first plane $E_1$ and the second plane $E_2$ are radially opposite to one another across the central axis of the outlet section.

* * * * *